Dec. 24, 1968       J. BRÜDERLEIN       3,417,630
VIBRATORY APPARATUS
Filed June 27, 1966

Inventor:
Johannes Brüderlein
By: Spencer & Kaye
Attorneys

United States Patent Office 3,417,630
Patented Dec. 24, 1968

3,417,630
VIBRATORY APPARATUS
Johannes Brüderlein, Rheinhausen, Germany, assignor to Fried Krupp Gesellschaft mit beschrankter Haftung
Filed June 27, 1966, Ser. No. 560,473
Claims priority, application Germany, July 3, 1965, B 82,669
4 Claims. (Cl. 74—61)

ABSTRACT OF THE DISCLOSURE

Resonant vibratory apparatus arrangement having a working mass to be linearly vibrated, a counter mass, and connecting spring means, the working mass including two spaced side walls and a transverse member which interconnects the side walls and reinforces the working mass. The counter mass is subjected to a periodically varying force and is formed by a hollow box oriented transversely to the principal direction of vibration of the working mass and encloses the transverse member of the working mass. The spring means are disposed connectingly between the transverse member and the box enclosing the same.

---

The present invention relates to vibratory apparatus, and particularly to resonant vibrator arrangements.

The present invention is particularly concerned with an arrangement for vibrating a sieve or screen and incorporating two masses which vibrate with respect to each other, which masses are connected to one another and have energy storing springs interposed between them, one of these masses being directly excited by unbalance forces.

In such devices, which most generally serve as vibrating conveyors or sorters, one of the masses constitutes an operating or working mass and the other constitutes a counter mass.

In one known type of such resonant vibrator device, the unbalance force is provided by an unbalance weight which rotates about an axis passing through the center of inertia of the counter mass, this axis of rotation being arranged transversely to the operating or working mass, so that the force vector produced by the rotation of the unbalance weight does not exert a torque on the counter mass.

It has been found that in order to permit the axis of rotation of the unbalance weight to pass through the center of inertia of the counter mass it is necessary to provide a relatively massive structure. Furthermore, since such a weight is generally accessible from only one side of the resulting device, it is usually difficult to install or remove it.

In addition, the energy storage springs in known resonant vibrator devices are commonly constituted by opposed pairs of spaced rubber buffers which are periodically subjected to pressure. A plurality of pairs of such buffers are generally provided, with one buffer of each pair being mounted on a respective one of the vibratory masses. When the apparatus is at rest, the buffers on one mass do not contact those on the other mass. When it is desired to set the apparatus into vibration, a certain vibration amplitude between the masses must be achieved before these buffers begin to engage one another. The possibility thus arises that under certain circumstances, particularly at low ambient temperatures which would cause the rubber buffers to shrink and thus to increase the spacing between each pair thereof, difficulties will be encountered in attempting to set the apparatus into vibration. Even when this problem does not arise, the continuous striking of the buffers against each other during normal operation will often constitute an annoyance.

It is therefore a primary object of the present invention to eliminate these drawbacks and difficulties.

Another object of the present invention is to eliminate the difficulties presented by the use of rubber buffers according to the prior art.

Still another object of the present invention is to eliminate the annoyance created in prior art devices by the continuous striking of rubber buffers against one another.

Yet another object of the present invention is to eliminate the difficulties previously encountered in attempting to set such apparatus into vibration.

A still further object of the present invention is to eliminate the need for a massive counter mass in arrangements of this type.

These and other objects according to the present invention are achieved by the provision of resonant vibrating apparatus including a working mass, a counter mass, and spring means connected therebetween. More specifically, the working mass is arranged to be vibrated in a linear manner and includes two spaced side walls and a transverse member interconnecting the side walls and reinforcing the working mass. The counter mass is arranged to be subjected to the action of a periodically varying force and is constituted by a hollow box oriented transversely to the principal direction of vibration of the working mass and enclosing the transverse member of the working mass. Finally, the spring means are disposed between the transverse member and the box for connecting the two together.

Additional objects and advantages of the present invention will become apparent upon consideration of the following description when taken in conjunction with the accompanying drawings in which.

Figure 1:
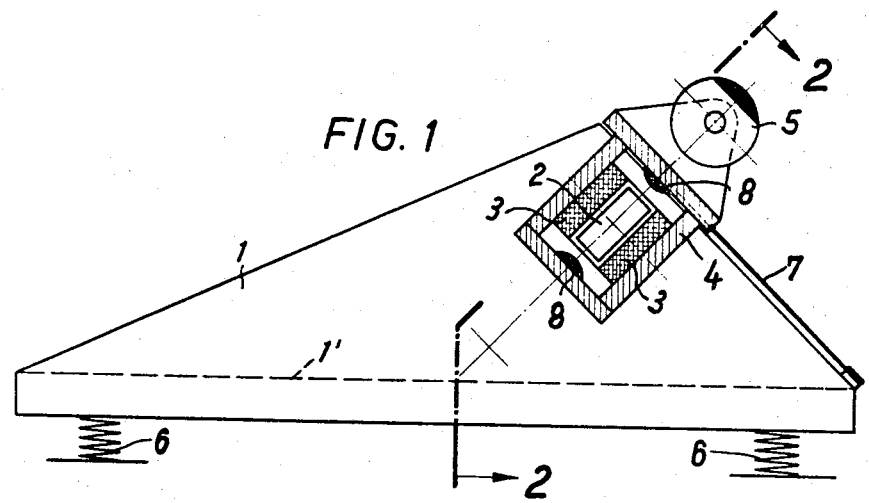
FIGURE 1 is a longitudinal, cross-sectional view of a first arrangement according to the present invention taken along the line 1—1 of FIGURE 2.
Figure 2:
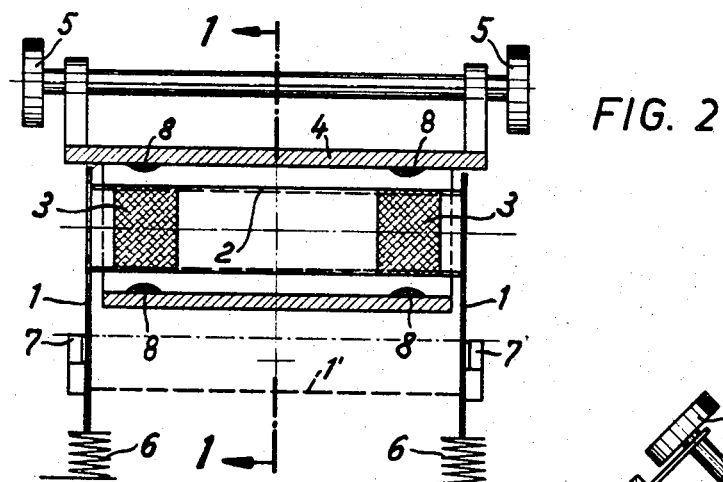
FIGURE 2 is a cross-sectional view taken along the line 2—2 of FIGURE 1.

Referring now specifically to FIGURES 1 and 2, there is shown a resonant vibratory apparatus having an operating mass constituted by a screening box which includes two substantially triangular side walls 1 connected to each other by a hollow box member 2 which acts as a stiffening reinforcement between the walls 1. The apparatus further includes a counter mass 4 having the general form of a hollow box surrounding member 2, the members 2 and 4 being connected together by interposed rubber elements 3 which act as shear springs.

The rubber suitable for the rubber springs may be of a soft type with a Shore hardness of about 50 to 60 degrees.

There is also provided an unbalance drive 5 constituted by an eccentric mass which is driven by a suitable rotary device (not shown), such as an electric motor for example, whose shaft is arranged parallel to the longitudinal axis of member 4. The screening box, which is also provided with a screen 1', is supported on a stationary foundation by means of vibration insulating springs 6. The counter mass 4 is connected to the walls 1 by means of leaf springs 7 which are connected to the counter mass at a point spaced from its center of gravity and which are oriented perpendicular to the principal direction of vibration of the working mass.

In order to place this arrangement into operation, the unbalance weight 5 is driven into rotation and produces a force vector which excites the counter mass 4 into oscillation. If the resulting force vector produced by unbalance weight 5 is oriented parallel to the direction of the principal desired vibration, i.e., at right angles to the longitudinal axes, of leaf springs 7, and if the resonant shear vibration frequency of shear springs 3 is appropriately selected, the vibratory system will be subjected to vibrations at a frequency substantially equal to its resonant frequency. However, when the force vector produced by unbalanced weight 5 is perpendicular to the principal direction of vibration, i.e., parallel to the longitudinal axis of leaf springs 7, this force vector will tend to pivot box 4 about an axis passing through the points at which box 4 is connected to springs 7 which points are in motion thus subjecting springs 3 to compressive and tensile forces. Inasmuch as the pivot axis of box 4 is moving and the spring constant of a rubber spring to compressive forces is approximately 5 to 10 times as high as its spring constant with respect to shear forces, such turning moments will not be capable of exciting the system to resonance. Thus, no rotary vibration will result, and there will only be produced a pure linear vibration in the principal direction of vibration perpendicular to the longitudinal axes of leaf springs 7.

The arrangement shown in FIGURES 1 and 2 is also provided with abutment buffers 8 disposed in the path of the principal vibration direction of element 2. These abutment buffers 8 are arranged to limit the vibration amplitude of element 2 with respect to box 4 so that, when a given vibration amplitude is reached, they serve to flatten the resonant vibration curve of the apparatus.

Figure 3:
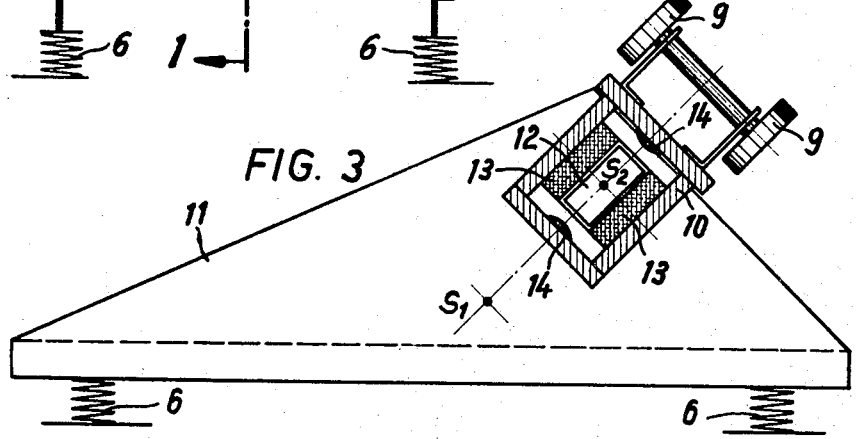
FIGURE 3 is a view similar to that of FIGURE 1 of a second arrangement according to the present invention.

Referring now to FIGURE 3, there is shown an arrangement which differs from that of FIGURES 1 and 2 primarily in that the axis of rotation of the unbalance weight 9 is disposed at right angles to the axis of rotation of the unbalance weight 5 of FIGURES 1 and 2. In the arrangement of FIGURE 3, the counter mass 10 is also constituted by a hollow box enclosing a hollow box-like element 12 which is connected between triangular side walls 11 so as to serve as a stiffening reinforcement therefor. Element 12 is connected to counter mass 10 through the intermediary of rubber shear springs 13 which are identical with the springs 3 of FIGURES 1 and 2 and which support the weight of counter mass 10.

The distance between the centers of gravity $S_1$ of the working mass and $S_2$ of the counter mass is made sufficiently large to reduce the inherent rotary vibration frequency about a line perpendicular to the line joining the centers of gravity $S_1$ and $S_2$ to a sufficiently low value to suppress substantially all rotary vibration. As a result, a substantially pure linear vibration will be produced which extends along the line joining these centers of gravity. Because of the orientation of unbalance weight 9, this embodiment presents the simplification of not requiring the separate leaf springs 7 of FIGURES 1 and 2.

The arrangement of FIGURE 3 is also provided with abutment buffers 14 which perform the same function as buffers 8 of FIGURES 1 and 2.

It may thus be seen that, in accordance with the present invention, there is provided a vibrator in which the counter mass is fashioned as a hollow box which surrounds a box carrier connecting the side walls of the working mass, there being spring elements connected between the box carrier and the counter mass which act as shear and pressure springs.

It may also be seen that, in accordance with a further feature of the present invention, the drawbacks of the heretofore known resonant vibrator screens are eliminated in that the rotary unbalance weight which produces the periodically changing force and the leaf springs are connected to the counter mass at points disposed from the centroidal axis of the counter mass so as to cause the rubber shear springs, which serve as energy storage devices, to be subjected to a shear movement in the principal direction of vibration and to be subjected to compression in a direction transverse to this principal direction of vibration.

In arrangements according to the present invention, the rotary unbalance weight produces a torque at the centroidal axis of the counter mass which normally acts to subject the rubber shear springs to a rotary movement which could tend to excite a rotary vibration between the two masses. The undesirable rotary vibrations are prevented, according to the present invention by mounting the counter mass on leaf springs which are connected to the counter mass at a point removed from its centroidal axis so as to give the counter mass a moving pivot axis. When, in such an arrangement, the force vector produced by the unbalance weight is parallel to the direction of principal vibration, the two masses will be excited into vibration in phase opposition in this direction at a frequency near resonance. When, however, this force vector is transverse to the principal direction of vibration, the vector tends to produce a rotary movement of the counter mass about its moving pivot axis, thereby subjecting the shear springs to compression forces rather than to shear forces. Since, as is well known, the spring constant of such rubber shear springs to compression is substantially greater than their spring constant to shear forces, resonant vibrations perpendicular to the principal direction of vibration do not arise and the desired linear vibration is conserved.

According to a further embodiment of the present invention, in which there are also provided a working mass consisting of triangular side walls connected together by a box-like member, rubber shear springs, and a counter mass having the form of a hollow box, the unbalance weight is arranged with its axis of rotation parallel to the direction in which compression can be exerted on the shear springs so that the unbalance weight never produces a force vector capable of inducing such compression forces. This permits a considerable structural simplification to be achieved because it enables the drive motor for the unbalance weight to be rigidly connected to the counter mass.

It will be understood that the above description of the present invention is susceptible to various modifications, changes and adaptations and the same are intended to be comprehended within the meaning and range of equivalents of the appended claims.

What is claimed is:

1. Resonant vibratory apparatus comprising in combination:
   (a) a working mass to be vibrated in a linear manner and including two spaced side walls and a transverse member interconnecting said walls and reinforcing said working mass;
   (b) a counter mass arranged to be subjected to the action of a periodically varying force and constituted by a hollow box oriented transversely to the principal direction of vibration of said working mass and enclosing said transverse member; and
   (c) spring means connecting said transverse member to said box wherein said spring means are constituted by rubber shear springs, and said masses are arranged to vibrate in phase opposition to one another;
   (d) a rotary unbalance weight mounted on said counter mass for rotation about an axis parallel to the longitudinal centroidal axis of said box for producing such periodically varying force, whereby rotation of said unbalance weight subjects said shear spring to shear forces parallel to said principal direction of vibration and to compression forces perpendicular thereto; and
   (e) leaf springs each having one end connected to said box at a point spaced from its centroidal axis and arranged for permitting relative motion between said counter mass and said working mass in the principal direction of vibration of said working mass and for suppressing relative motion between said counter mass and said working mass transverse to the principal direction of vibration.

2. An arrangement as defined in claim 1 wherein said leaf springs are oriented substantially perpendicularly to said principal direction of vibration.

3. An arrangement as defined in claim 2 wherein each of said leaf springs has its other end connected to said working mass.

4. Resonant vibratory apparatus comprising, in combination:
   (a) a working mass to be vibrated in a linear manner and including two spaced side walls and a transverse member interconnecting said walls and reinforcing said working mass;
   (b) a counter mass arranged to be subjected to the action of a periodically varying force and constituted by a hollow box oriented transversely to the principal direction of vibration of said working mass and enclosing said transverse member; and
   (c) spring means connecting said transverse member to said box wherein said spring means are constituted by rubber shear springs, and said masses are arranged to vibrate in phase opposition to one another;
   (d) a rotary unbalanced weight mounted on said counter mass for rotation about an axis perpendicular to a plane defining the direction of shear vibration of said spring and for producing such periodically varying force, whereby rotation of said unbalance weight continually subjects said shear springs to shear forces.

References Cited

UNITED STATES PATENTS

| 2,200,724 | 5/1940 | Robins | 209—366.5 |
| 2,294,448 | 9/1942 | Coyle et al. | 74—61 |
| 2,729,332 | 1/1956 | Gruner | 74—61 XR |
| 3,040,591 | 6/1962 | Peregrine et al. | 74—61 |
| 3,089,582 | 5/1963 | Musschoot et al. | 74—61 |

FRED C. MATTERN, JR., *Primary Examiner.*

W. S. RATLIFF, *Assistant Examiner.*